US012171215B2

(12) United States Patent
Daubeney et al.

(10) Patent No.: US 12,171,215 B2
(45) Date of Patent: Dec. 24, 2024

(54) PEST REPELLERS

(71) Applicant: Meika Ltd, Reading (GB)

(72) Inventors: Justin John Daubeney, Swindon (GB); Andrew Clifford Donaldson, Thatcham (GB)

(73) Assignee: MEIKA LTD (GB)

( * ) Notice: Subject to any disclaimer, the term of this patent is extended or adjusted under 35 U.S.C. 154(b) by 491 days.

(21) Appl. No.: 17/465,472

(22) Filed: Sep. 2, 2021

(65) Prior Publication Data
US 2022/0061307 A1    Mar. 3, 2022

(30) Foreign Application Priority Data

Sep. 2, 2020 (GB) ..................................... 2013781

(51) Int. Cl.
*A01M 29/18* (2011.01)
*A01M 29/10* (2011.01)
(Continued)

(52) U.S. Cl.
CPC ............ *A01M 29/18* (2013.01); *A01M 29/10* (2013.01); *G01V 8/005* (2013.01); *H04R 1/028* (2013.01);
(Continued)

(58) Field of Classification Search
CPC .................................................. A01M 29/18
See application file for complete search history.

(56) References Cited

U.S. PATENT DOCUMENTS 5,463,595 A * 10/1995 Rodhall ................. G08B 13/00
340/426.25
7,271,689 B1    9/2007 Danby et al.
(Continued)

FOREIGN PATENT DOCUMENTS

CN        106508882     * 10/2016    ........... A01K 15/027
EP        3 692 793 A1    8/2020
(Continued)

OTHER PUBLICATIONS

The above references were cited in a Feb. 1, 2022 European Search Report, that Issued European Application No. 21 19 4609.
(Continued)

*Primary Examiner* — Hongmin Fan
(74) *Attorney, Agent, or Firm* — Cowan, Liebowitz & Latman, P.C.; Mark Montague

(57) ABSTRACT

A pest repeller comprises a pest detector operable to detect the presence of a pest and then to generate an internal trigger signal, a speaker operable to produce ultrasound, and an antenna operable to transmit wirelessly and to receive wirelessly external trigger signals. A controller is configured to receive internal trigger signals from the pest detector and to receive external trigger signals from the antenna. Upon receiving an internal trigger signal, the controller is configured to provide a speaker drive signal to drive the speaker to produce the ultrasound, to generate an external trigger signal and to provide the external trigger signal to the antenna for transmission of the external trigger signal. Upon receiving an external trigger signal, the controller is configured to provide a speaker drive signal to drive the speaker to produce the ultrasound.

19 Claims, 4 Drawing Sheets

(51) Int. Cl.
*G01V 8/00* (2006.01)
*H04R 1/02* (2006.01)
*H04R 1/40* (2006.01)
*H04R 3/12* (2006.01)
*H05B 47/115* (2020.01)

(52) U.S. Cl.
CPC .............. *H04R 1/403* (2013.01); *H04R 3/12* (2013.01); *H05B 47/115* (2020.01); *H04R 2201/401* (2013.01); *H04R 2420/07* (2013.01)

(56) References Cited

U.S. PATENT DOCUMENTS

| | | | |
|---|---|---|---|
| 8,054,186 B1 * | 11/2011 | Ray | A01M 29/18 340/573.2 |
| 2002/0158736 A1 | 10/2002 | Gottschalk | |
| 2003/0071735 A1 | 4/2003 | Hanson et al. | |
| 2006/0174533 A1 | 8/2006 | Rusciano et al. | |
| 2013/0207760 A1 | 8/2013 | Clarke et al. | |
| 2014/0326195 A1 * | 11/2014 | Gitrie | A01M 29/00 119/712 |
| 2020/0037603 A1 | 2/2020 | Felton-Armouti | |

FOREIGN PATENT DOCUMENTS

| | | |
|---|---|---|
| EP | 3692793 A | 8/2020 |
| WO | 2009/141078 A1 | 11/2009 |
| WO | 2013/144312 A1 | 10/2013 |

OTHER PUBLICATIONS

PestBye 'Smart Cat Repeller System (Pair)' Product Page, Available at: https://www.primrose.co.uk/smart-cat-repeller-system-pair-battery-powered-pestbye-p-136211.html [accessed Feb. 18, 2021] See especially description of multiple repellers joining together to create a deterrent system using a low power RF signal and PIR sensor.

* cited by examiner

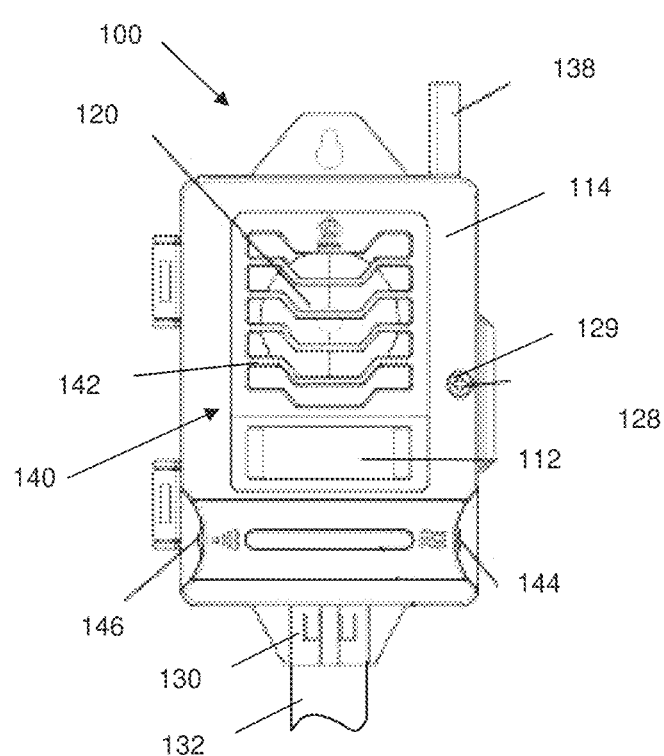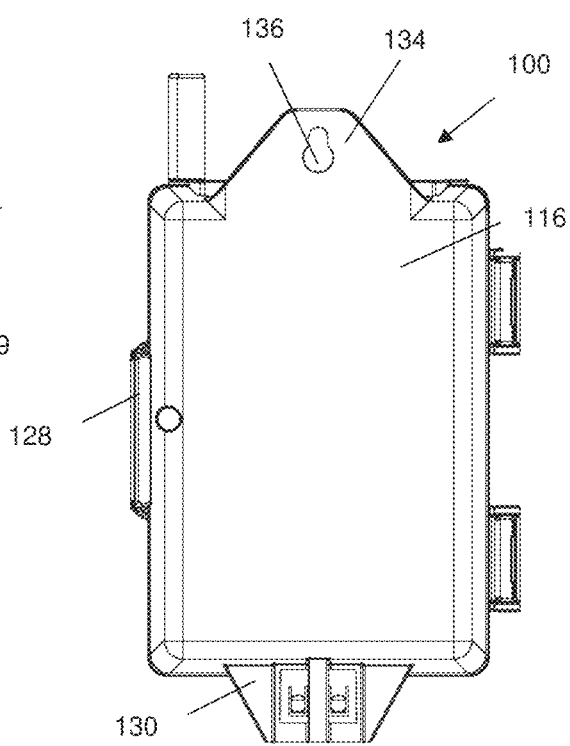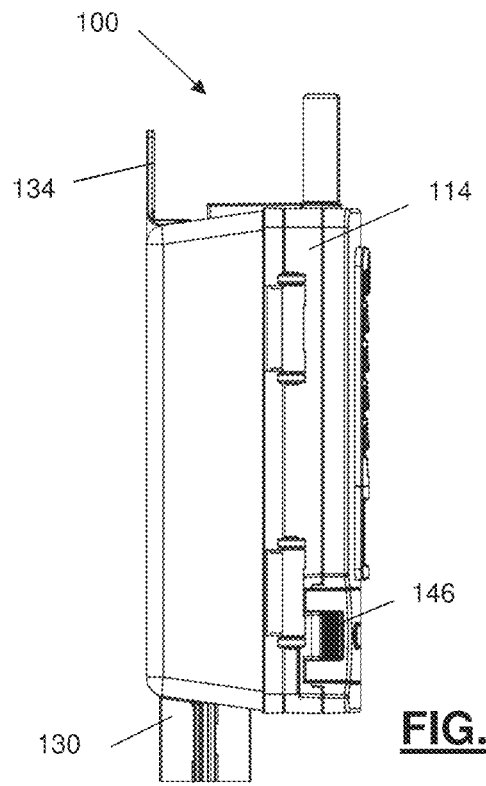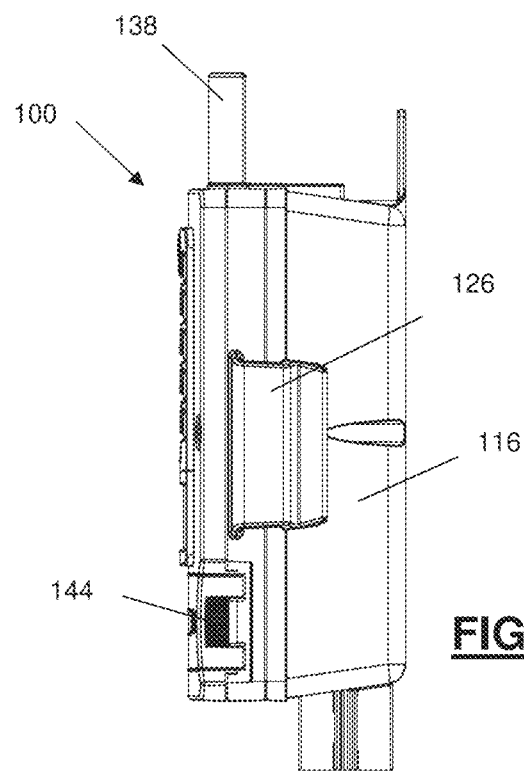

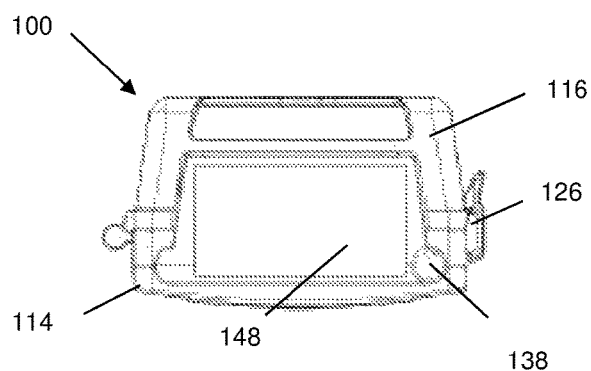
FIG. 6
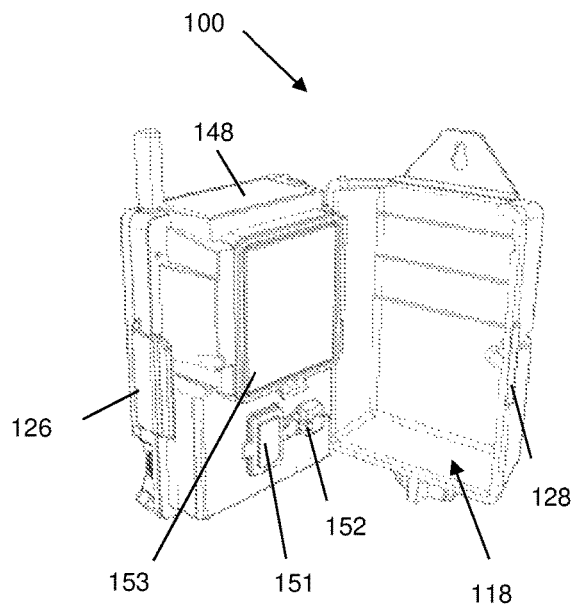
FIG. 8
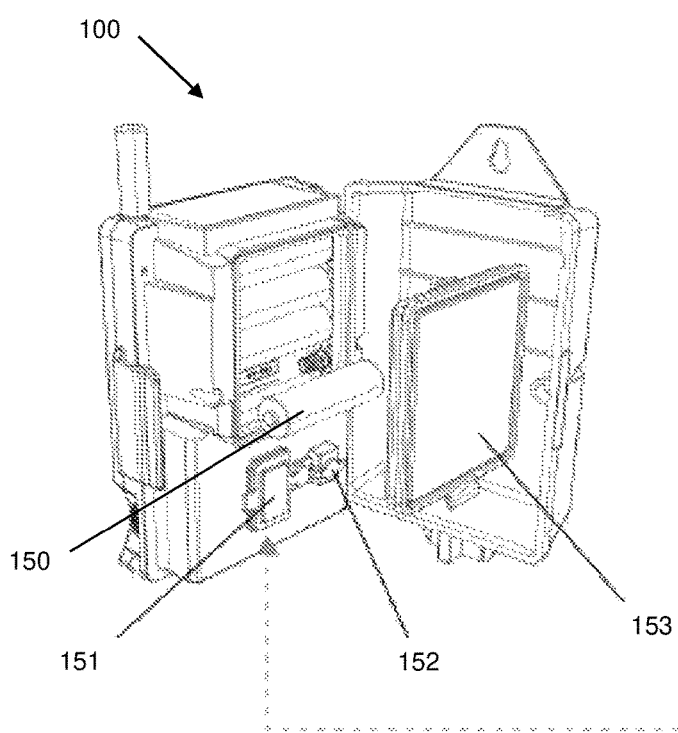
FIG. 7
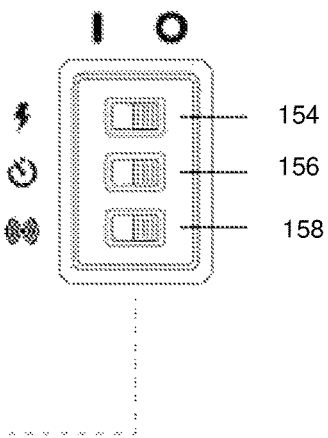

PEST REPELLERS

FIELD OF THE INVENTION

The present invention relates to pest repellers that operate to discourage pests, such as cats and other animals, from visiting a space, such as a garden

BACKGROUND OF THE INVENTION

Animals such as cats are sometimes unwanted visitors to spaces such as private gardens. This may be due to damage caused to the garden by the pest digging or eating plants, or by the pest urinating or defecating in the garden.

Humane methods of discouraging or preventing pests from visiting spaces such as a garden have been developed. One such technique is to provide the space with a device having a PIR sensor to detect movement of a pest, and then to emit ultrasound. While not audible to most humans, the ultrasound causes cats and other animals discomfort and so causes the pest to leave the garden. Over time, the pest learns to avoid the garden. An example of this type of device is the PestBye® cat repeller available from Primrose® (www primrose.co.uk).

SUMMARY OF THE INVENTION

Against this background, and from a first aspect, the present invention resides in a pest repeller system comprising connected pest repellers. Each of the pest repellers comprises a pest detector operable to detect the presence of a pest and to generate an internal trigger signal in response to detecting the presence of the pest. Each pest repeller also comprises a speaker operable to produce ultrasound. Each pest repeller comprises an antenna operable to transmit wirelessly external trigger signals to others of the pest repellers, and to receive wirelessly external trigger signals from others of the pest repellers. The antenna may be operable to transmit external trigger signals wirelessly to all the others of the pest repellers, and to receive external trigger signals wirelessly from the others of the pest repellers, or just a subset.

Each pest repeller also comprises a controller that is configured to receive internal trigger signals from the pest detector and to receive the external trigger signals from the antenna. Upon receiving an internal trigger signal, each controller is configured to provide a speaker drive signal to drive the speaker to produce the ultrasound, to generate an external trigger signal and to provide the external trigger signal to the antenna for transmission of the external trigger signal. Upon receiving an external trigger signal, each controller is configured to provide a speaker drive signal to drive the speaker to produce the ultrasound and, optionally, to generate a further external trigger signal and to provide the further external trigger signal to the antenna of the pest repeller for transmission of the further external trigger signal.

Advantageously, this pest repeller system provides a network of connected pest repellers that require only a single pest repeller to detect the presence of a pest to trigger all the pest repellers to emit ultrasound. Causing all pest repellers to emit ultrasound together provides a more effective deterrent. A pest will not simply avoid the nearest pest repeller before trying again to enter a space protected by the pest repellers. As all pest repellers are emitting ultrasound, an effective boundary may be created that the pest will not want to cross.

The controller of each pest repeller may be configured to activate a timer-delay function such that, upon providing a speaker drive signal to drive the speaker of the pest repeller to produce the ultrasound, the controller is inhibited from providing a further speaker drive signal until a pre-set time delay has passed. This prevents any of the pest repellers from repeatedly emitting ultrasound as further pest repellers are triggered into emitting further external trigger signals. Put another way, each pest repeller is triggered into emitting ultrasound only once per trigger event.

Optionally, each pest repeller further comprises a user-operated timer-delay control operable such that a user may enable or disable the controller of the pest repeller from activating the timer-delay function. The user-operated timer-delay control may be a switch, such as a press switch or a rocker switch.

The pest detector of each pest repeller may a motion sensor operable to detect motion of the pest, or may be an infra-red sensor operable to detect body heat of the pest. Advantageously, the pest detector of each pest repeller may an infrared motion sensor. Optionally, each pest repeller further comprises a user-operated detection range control operable such that a user may select a distance range over which the motion sensor of the pest repeller will detect the presence of the pest. The user-operated detection range control may be rotatable dial or knob.

The controller of each pest repeller may be operable to vary the speaker drive signal such that the frequency of the ultrasound produced by the speaker of the pest repeller varies. This may cause the frequency to vary as the ultrasound is being produced and/or to vary between each occasion the ultrasound is produced. Advantageously, each pest repeller may further comprise a user-operated frequency control operable such that a user may adjust the frequency of the ultrasound produced by the speaker of the pest repeller. This allows the frequency to be adjusted to target certain types of pest. The user-operated frequency control may be rotatable dial or knob.

Optionally, each pest repeller further comprises a flash and wherein the controller of each pest repeller is further configured to provide a flash activation signal to cause the flash to illuminate upon receiving an internal trigger signal. A brief flash of light provided a further deterrent to pests, in addition to the ultrasound. Each pest repeller may further comprise a user-operated flash control operable such that a user may enable and disable the flash of the pest repeller. The user-operated flash control may be a switch, such as a press switch or a rocker switch.

Each pest repeller may further comprise one or more batteries operable to power the pest repeller. Optionally, each pest repeller further comprises a solar panel operable to generate electrical power to charge the one or more batteries of the pest repeller. Also, each pest repeller may further comprise an electrical connection to allow the pest repeller to be connected to an electrical supply to charge the one or more batteries. The electrical connection may be a USB socket.

The transmission range of the antenna of each pest repeller may be less than twice a distance range over which the motion sensor of each repeller will detect the presence of the pest. The distance range may be a maximum distance range. This arrangement is advantageous as it ensures overlap between adjacent pest repellers. That is, to ensure adjacent pest repellers remain in communication range with each other, their separation must be small enough to ensure that the coverage provided by the distance range of the motion sensors overlap. This then ensures complete coverage with no blind spots between pest repellers. Hence, it is advantageous for each pest repeller to be positioned within the transmission and reception range of another of the pest repellers. Moreover, the pest repellers may be positioned to from a ring such that each pest repeller is within the transmission and reception range of two other pest repellers. This arrangement provides a complete ring of detection with no blind spots. For example, the pest repellers may be placed in a ring around the boundary of a property or a garden to stop pests encroaching into the property or garden.

The present invention also resides in a pest repeller like any of those described above with respect to the overall pest repeller system.

From a further aspect, the present invention resides in a method of repelling pests using a network of connected pest repellers. The method comprises detecting the pest with a first pest repeller of the pest repellers. Upon detecting the pest with the first pest repeller, the method comprises emitting ultrasound from the first pest repeller and transmitting a trigger signal to others of the pest repellers. Upon the others of the pest repellers receiving the trigger signal, the method comprises emitting ultrasound from the others of pest repellers and, optionally, emitting further trigger signals from the others of pest repellers.

The method may further comprise, upon emitting ultrasound, starting a time delay during which time further ultrasound is not emitted by the pest repeller.

Optionally, the method further comprises, upon emitting ultrasound, illuminating a flash.

The pest repeller may be used to repel various types of pest, including animals and/or insects. For example, the pest repeller may be used to repel any of cats, dogs, deer and rodents. In particular, the pest repeller is intended for use as a cat repeller.

Further optional features will become evident to the person skilled in the art upon reading the following detailed description of the invention.

BRIEF DESCRIPTION OF THE DRAWINGS

In order that the invention can be more readily understood, reference will now be made by way of example only, to the accompanying drawings in which:

FIG. 2 is a front view of one of the pest repellers of FIG. 1;

FIG. 3 is a side view of the pest repeller of FIG. 2;

FIG. 4 another side view of the pest repeller of FIG. 2, showing the opposite side to that of FIG. 3;

FIG. 5 is a rear view of the pest repeller of FIG. 2;

FIG. 6 is a top view of the pest repeller of FIG. 2;

FIG. 7 is a perspective view of the pest repeller of FIG. 2;

FIG. 8 is a further perspective view of the pest repeller of FIG. 2.

DETAILED DESCRIPTION OF THE INVENTION

Figure 1:
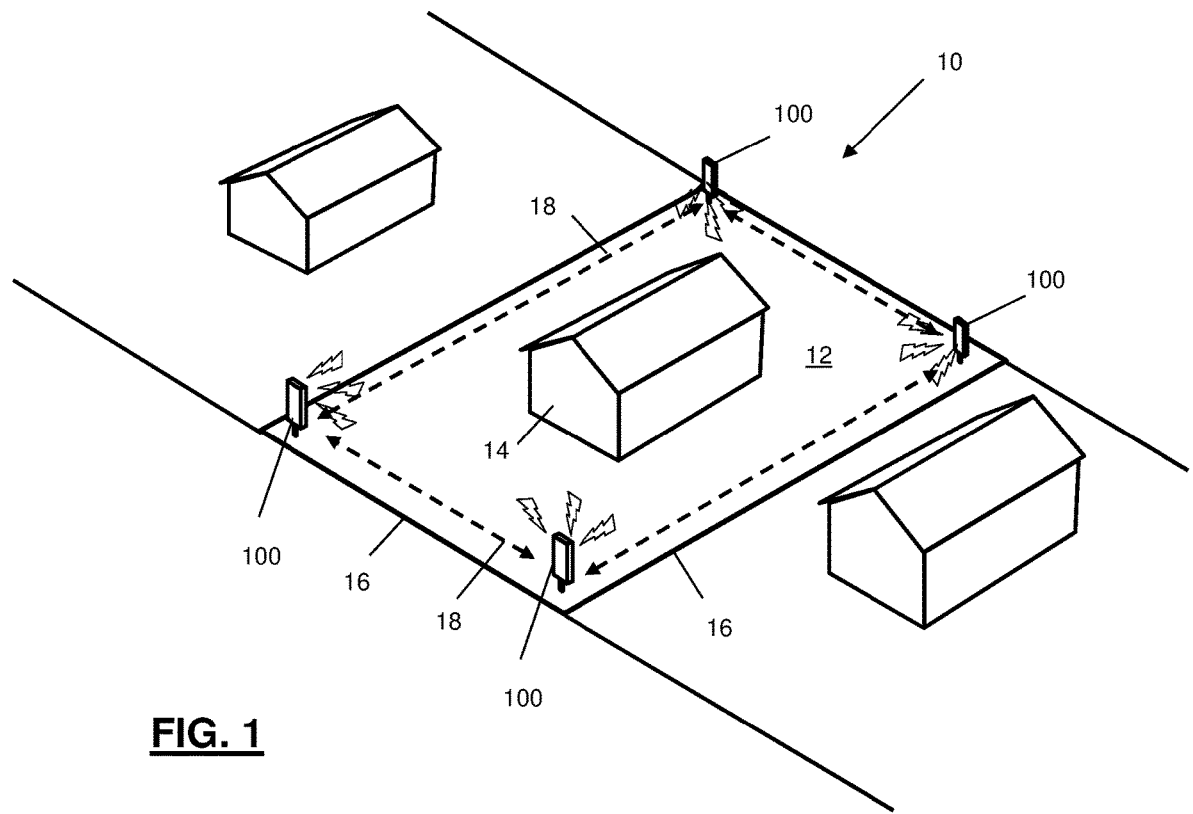
FIG. 1 is a perspective view of multiple pest repellers linked in a pest repeller system.

A pest repeller system 10 is shown in FIG. 1 that comprises four pest repellers 100 dispersed around the edge of a garden 12 of a house 14. Although the pest repellers 100 are effective against a range of animals, the pest repellers 100 are primarily intended to act as cat repellers.

The pest repellers 100 are of a common design. Each pest repeller 100 works by emitting a range of ultrasonic frequencies that has been determined to deter pests such as cats from spaces like the garden 12 in a safe and humane way. Each pest repeller 100 is triggered to emit ultrasound by a pest coming into range of a PIR motion sensor 112 of the pest repeller 100. PIR motion sensors 112 are used to preserve battery life and also stop pests from establishing a pattern which would occur if the pest repellers 100 emitted ultrasound continuously. The pest repellers 100 are distributed around the edge of the garden 12 such that the ultrasound they emit overlaps and so effectively forms a boundary 16 that pests are unwilling to cross.

A pest repeller 100 is shown in more detail in FIGS. 2 to 8. The pest repeller 100 comprises a body 114 and a hinged door 116 that together form a waterproof compartment 118 that houses components of the pest repeller 119 such as the PIR motion sensor 112, a speaker 120, a battery holder 122 and a controller 124. The body 114 is provided with a resilient clip 126 that engages with a detent 128 provided on the door 116 firmly press the door 116 against the body 114. The door 116 is further secured against the body 114 by a screw 129 that extends through a hole provided in the body 114 to engage with the door 116.

The body 114 is also provided with a socket 130 at its base that may be used to receive a stake 132 provided with the pest repeller 100. The stake 132 may be inserted in the ground to support the pest repeller 100 in a desired location, for example in a spot to provide good coverage of a garden. A tab 134 also extends from the top of the body 114, and the tab 134 is provided with a tapering hole 136 with a narrow upper part and a wider lower part. This allows the pest repeller 100 to be mounted to a wall, fence or other upright surface. For example, the pest repeller 100 may be hung from a fixing like a screw, nail or bolt, driven into the upright surface, with a head of the fixing being received in the tapering hole 136.

The front face 140 of the body 114 also forms the front of the pest repeller 100. The front face 140 of the body 114 is provided with apertures 142 behind which the speaker 120 is located. As can be seen from FIG. 1, the PIR motion sensor 112 is located below the apertures 142. The front face 140 of the body 114 is also provided with a pair of sideways-facing pockets beneath the PIR motion sensor 112. The pockets face in opposite directions, and a rotatable dial 144, 146 protrudes from each pocket.

The speaker 120 is emits the ultrasound which radiates outwardly to cover an angular range of around 110 degrees and is audible for around 10 m (depending on the animal), and so covers an area of approximately 100 m2. One of the dials corresponds to a frequency adjuster dial 144. A user may rotate the frequency adjuster dial 144 to increase or decrease the frequency of the ultrasound produced by the speaker 120. This allows the pest repeller 100 to be optimised towards different pests because the larger the pest, the lower the frequency should be to be optimal.

The PIR motion sensor 112 can detect motion up to 10 metres from the pest repeller 100. The second dial is a sensitivity adjuster dial 146 that allows a user to adjust the sensitivity of the pest repeller 100, i.e. the detection range over which the PIR motion sensor 112 will detect a pest. This functionality may be used to stop pests from establishing a pattern with the pest repeller system 10. For example, a cat may learn at which distance a pest repeller 100 is triggered and so feel safe to approach up to that distance. Varying the sensitivity of the cat repeller 100 prevents the cat from establishing such a pattern which results in the cat from maintaining a greater distance from the pest repeller 100 at all times.

FIGS. 7 and 8 show the compartment 118 defined by the body 114 and door 116. The upper part of the compartment 118 forms a battery holder 122. The battery holder 122 comprises a removable cover 153 that clips into place, for example using snap fixings. A waterproof seal is provided around the edge of the cover 153. In this embodiment, the battery holder 122 is configured to hold four batteries. The batteries may be regular AA batteries. The pest repeller 100 may be a solar-powered unit, as shown in FIGS. 1 and 7. As can be seen, a solar panel 148 provided on the top of the body 114 charges four 1200 mAh rechargeable batteries 150. A USB socket 152 is also provided to allow the batteries 150 to be charged when, for instance, after a lack of sunlight. This ensures that the pest repeller 100 may be used all year round.

A bank 151 of three switches 154, 156, 158 are located in the compartment 118 beneath the battery holder 122.

A flash switch 154 allows a user to enable a flash function. When enabled, this sees a light 160 provided on the front of the body 114 briefly illuminate when the speaker 120 is activated. The flash function provides an additional deterrent, similar to a camera flash, that further scares pests.

A delay switch 156 allows a user to enable a delay timer function. When enabled, this causes a delay of around 30-40 seconds before the speaker 120 can activate again. This ensures that the pest repeller 100 is not constantly activating and so preserves battery life. This also makes it more difficult for a pest to establish a pattern.

A transmitter switch 158 is also provided that allows a user to disable the radio transmitter function of the pest deterrent 100, as will be described in further detail below. This function may be used when the pest repeller 100 is being used on its own without other pest repellers 100 in a pest repeller system 10.

Each pest repeller 100 can communicate with the other pest repellers 100 in the pest repeller system 10 using rf (radio frequency) links. Each pest repeller 100 is provided with an antenna 138 that extends from the top of the body 114. When the speaker 120 of one pest repeller 100 is activated, an rf signal 18 is also sent from the antenna 138 of that pest repeller 100. This rf signal 18 will be received by any other pest repellers 100 within range (for example, within a range of around 20 m). Receiving the rf signal 18 causes the speakers 120 of the pest repellers 100 to activate and for the pest repellers 100 to send further rf signals 18 from their antennas 138. The rf signals 18 are shown figuratively in FIG. 1.

A pest repeller 100 out of range of range of the first pest repeller 100 may still be triggered as it may receive a rf signal 18 from one of the secondary pest repellers 100 to be activated. Hence a network of pest repellers 100 may be formed where all are placed within rf range of at least one other pest repeller 100. The resulting pest repeller system 10 will always have all pest repellers 100 activate when the PIR motion sensor 112 of one of the pest repellers 100 is triggered.

Preferably, the delay switch 156 is set to on when pest repellers 100 are used together in the pest repeller system 10. This ensures that the pest repellers 100 are not activated multiple times in quick succession as they receive rf signals 18 from different pest repellers 100.

Figure 9:
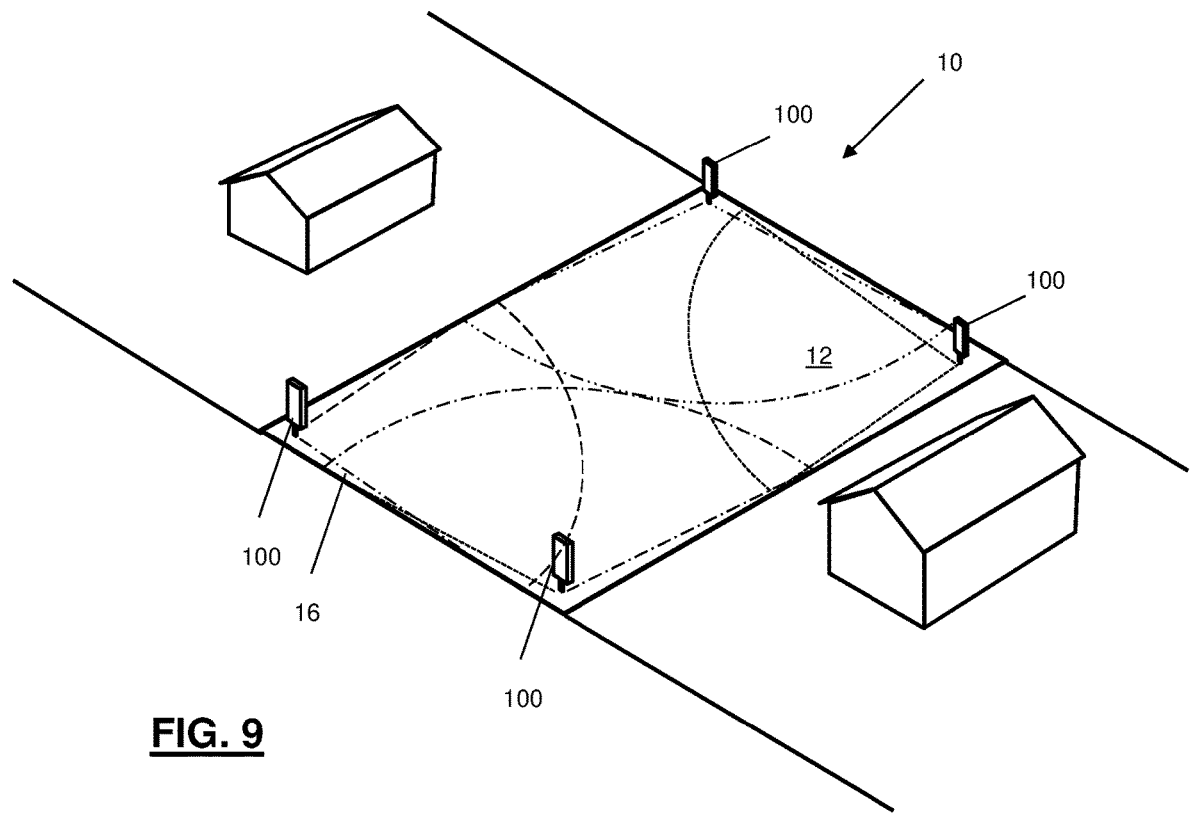
FIG. 9 is a perspective view of the pest repeller system of FIG. 1 that also shows the coverage of the devices.

Thus, a pest that triggers one pest repeller 100 to activate will cause all pest repellers 100 in the pest repeller system 10 to activate together. FIG. 9 shows the resulting coverage provided by the four pest repellers 100 of the pest repeller system 10 of FIG. 1. By suitably positioning and orienting the pest repellers 100, overlapping coverage of the ultrasound may be created from each pest repeller 100 to create the perimeter 16 around the garden 12. The A person skilled in the art will appreciate that the above embodiments may be varied in many different respects without departing from the scope of the present invention that is defined by the appended claims.

What is claimed is:

1. A pest repeller comprising:
a pest detector operable to detect a presence of a pest and to generate an internal trigger signal in response to detecting the presence of the pest;
a speaker operable to produce ultrasound;
an antenna operable to transmit wirelessly and to receive wirelessly external trigger signals; and
a controller configured:
to receive internal trigger signals from the pest detector and to receive external trigger signals from the antenna;
upon receiving an internal trigger signal, to provide a speaker drive signal to drive the speaker to produce the ultrasound, to generate an external trigger signal and to provide the external trigger signal to the antenna for transmission of the external trigger signal for others of the pest repeller; and
upon receiving an external trigger signal from another pest repeller, to provide a speaker drive signal to drive the speaker to produce the ultrasound;
wherein the controller is configured to activate a timer-delay function such that, upon providing a speaker drive signal to drive the speaker to produce the ultrasound, the controller is inhibited from providing a further speaker drive signal until a pre-set time delay has passed.

2. The pest repeller of claim 1 wherein, upon receiving an external trigger signal, the controller is further configured to generate a further external trigger signal and to provide the further external trigger signal to the antenna for transmission of the further external trigger signal.

3. The pest repeller of claim 1, further comprising a user-operated timer-delay control operable such that a user may enable or disable the controller from activating the timer-delay function.

4. The pest repeller of claim 1, wherein the pest detector is a motion sensor operable to detect motion of the pest and/or an infra-red sensor operable to detect body heat of the pest.

5. The pest repeller of claim 1, further comprising a user-operated detection range control operable such that a user may select a distance range over which the motion sensor will detect the presence of the pest.

6. The pest repeller of claim 1, wherein the controller is operable to vary the speaker drive signal such that the frequency of the ultrasound varies.

7. The pest repeller of claim 1, further comprising a flash; and wherein the controller is further configured to provide a flash activation signal to cause the flash to illuminate upon receiving an internal trigger signal.

8. The pest repeller of claim 1, further comprising one or more rechargeable batteries operable to power the pest repeller, and a solar panel operable to generate electrical power to charge the one or more rechargeable batteries.

9. The pest repeller of claim 1, wherein a transmission range of the antenna is less than twice a distance range over which the motion sensor will detect the presence of the pest.

10. A pest repeller system comprising connected pest repellers, wherein each of the pest repellers comprises:
- a pest detector operable to detect the presence of a pest and to generate an internal trigger signal in response to detecting the presence of the pest;
- a speaker operable to produce ultrasound;
- an antenna operable to transmit wirelessly external trigger signals to others of the pest repellers, and to receive wirelessly external trigger signals from others of the pest repellers; and
- a controller configured:
- to receive internal trigger signals from the pest detector and to receive the external trigger signals from the antenna;
- upon receiving an internal trigger signal, to provide a speaker drive signal to drive the speaker to produce the ultrasound, and to generate an external trigger signal and to provide the external trigger signal to the antenna for transmission of the external trigger signal;
- upon receiving an external trigger signal, to provide a speaker drive signal to drive the speaker to produce the ultrasound; and
- activate a timer-delay function such that, upon providing a speaker drive signal to drive the speaker of the pest repeller to produce the ultrasound, the controller is inhibited from providing a further speaker drive signal until a pre-set time delay has passed.

11. The pest repeller system of claim 10, wherein, upon receiving an external trigger signal, the controller of each pest repeller is further configured to generate a further external trigger signal and to provide the further external trigger signal to the antenna of the pest repeller for transmission of the further external trigger signal.

12. The pest repeller system of claim 10, wherein each pest repeller further comprises a user-operated timer-delay control operable such that a user may enable or disable the controller of the pest repeller from activating the timer-delay function.

13. The pest repeller system of claim 10, wherein the pest detector of each pest repeller is a motion sensor operable to detect motion of the pest and/or an infra-red sensor operable to detect body heat of the pest.

14. The pest repeller system of claim 10, wherein the controller of each pest repeller is operable to vary the speaker drive signal such that the frequency of the ultrasound produced by the speaker of the pest repeller varies.

15. The pest repeller system of claim 10, wherein each pest repeller further comprises a flash and wherein the controller of each pest repeller is further configured to provide a flash activation signal to cause the flash to illuminate upon receiving an internal trigger signal.

16. The pest repeller system of claim 10, wherein each pest repeller further comprises one or more rechargeable batteries operable to power the pest repeller, and a solar panel operable to generate electrical power to charge the one or more batteries of the pest repeller.

17. The pest repeller system of claim 10, wherein a transmission range of antenna of each pest repeller is less than twice a distance range over which the motion sensor of each repeller will detect the presence of the pest.

18. The pest repeller system of claim 10, wherein each pest repeller is positioned to be within the transmission and reception range of another of the pest repellers.

19. The pest repeller system of claim 18, wherein the pest repellers are positioned to form a ring such that each pest repeller is within the transmission and reception range of two other pest repellers.

* * * * *